(12) United States Patent
Nix

(10) Patent No.: US 11,168,911 B2
(45) Date of Patent: Nov. 9, 2021

(54) FLUID CIRCULATION MONITORING SYSTEM

(71) Applicant: Sucxess LLC, Birmingham, MI (US)

(72) Inventor: Axel Nix, Birmingham, MI (US)

(73) Assignee: Sucxess LLC, Birmingham, MI (US)

( * ) Notice: Subject to any disclaimer, the term of this patent is extended or adjusted under 35 U.S.C. 154(b) by 0 days.

(21) Appl. No.: 16/291,028

(22) Filed: Mar. 4, 2019

(65) Prior Publication Data

US 2019/0204203 A1 Jul. 4, 2019

Related U.S. Application Data

(63) Continuation-in-part of application No. 15/583,574, filed on May 1, 2017, now Pat. No. 10,221,853.

(60) Provisional application No. 62/330,180, filed on May 1, 2016.

(51) Int. Cl.
*F24F 11/39* (2018.01)
*G01N 15/08* (2006.01)
*B01D 46/00* (2006.01)
*B01D 35/143* (2006.01)

(52) U.S. Cl.
CPC ............ *F24F 11/39* (2018.01); *B01D 35/143* (2013.01); *B01D 35/1435* (2013.01); *B01D 46/0086* (2013.01); *G01N 15/0806* (2013.01); *G01N 15/0826* (2013.01); *G01N 2015/084* (2013.01)

(58) Field of Classification Search
CPC .............. B01D 46/0086; B01D 35/143; B01D 35/1435; F24F 11/39; G01N 15/0826; G01N 2015/084
See application file for complete search history.

(56) References Cited

U.S. PATENT DOCUMENTS

| 4,430,214 A ‡ | 2/1984 | Baker | E04H 4/1209 210/16 |
| 5,234,481 A * | 8/1993 | Jardinier | F24F 8/10 95/19 |
| 5,297,988 A * | 3/1994 | Nishino | A61L 9/12 222/644 |

(Continued)

OTHER PUBLICATIONS

Pentair Water Pool and Spa, Inc.; Dura-Glas and Max-E-Glas Centrifugal Pumps with Trap Owner's Manual, S413 (Rev. A), Apr. 15, 2010.‡

(Continued)

*Primary Examiner* — Atif H Chaudry
(74) *Attorney, Agent, or Firm* — Smartpat PLC

(57) ABSTRACT

A fluid circulation monitoring system includes a distributed processing system having a first processor located on-premises near a space filled with a circulating fluid and a second processor located off-premises. The first processor and the second processor are in communication with one another. A sensor is operatively connected to the first processor and senses at least one parameter associated with a flow rate of fluid through the circulation system. The distributed processing system is configured to process the at least one parameter and derive a volumetric fluid flow rate through a fluid pump which propels the fluid through the circulation system. Pattern recognition is applied to the at least one parameter to detect maintenance events and predict the need for maintenance events.

11 Claims, 5 Drawing Sheets

(56) References Cited

U.S. PATENT DOCUMENTS

| | | | | |
|---|---|---|---|---|
| 5,869,766 | A * | 2/1999 | Cucci | G01L 9/0075 73/706 |
| 7,484,938 | B2 ‡ | 2/2009 | Allen | F04D 15/00 417/12 |
| 8,404,112 | B2 ‡ | 3/2013 | Gaudin | B01D 24/14 210/16 |
| 9,273,481 | B2 ‡ | 3/2016 | Cooke | E04H 4/1272 |
| 2002/0070611 | A1 ‡ | 6/2002 | Cline | A61H 33/005 307/149 |
| 2003/0168516 | A1 ‡ | 9/2003 | Cline | E04H 4/129 237/2 A |
| 2005/0167345 | A1 ‡ | 8/2005 | De Wet | C02F 1/008 210/85 |
| 2008/0190177 | A1 * | 8/2008 | Wiggins | F02M 35/09 73/49.7 |
| 2009/0204263 | A1 ‡ | 8/2009 | Love | G05D 23/19 700/282 |
| 2011/0002792 | A1 ‡ | 1/2011 | Bartos | F04D 15/00 417/44.1 |
| 2013/0007954 | A1 ‡ | 1/2013 | Sutton | F16K 31/52483 4/490 |
| 2013/0197829 | A1 * | 8/2013 | Sherman, III | B01D 46/0086 702/45 |
| 2014/0125150 | A1 ‡ | 5/2014 | Alberth, Jr. | G05B 15/02 307/126 |
| 2015/0052978 | A1 * | 2/2015 | Beier | B01D 46/0086 73/38 |
| 2016/0332449 | A1 * | 11/2016 | Pourtier | B41J 2/18 |

OTHER PUBLICATIONS

Pentair Water Pool and Spa, Inc; Dura-Glas® and Dura-Glas® II Pool/Spa Pumps by Sta-Rite®, Mar. 2008.‡

Unknown Author, CEE Efficient Residential Swimming Pool Initiative, Jan. 2013, retrieved from https://library.cee1.org/system/files/library/9986/CEE_Res_SwimmingPoolInitiative_01Jan2013_Corrected.pdf.‡

\* cited by examiner

‡ imported from a related application

FLUID CIRCULATION MONITORING SYSTEM

TECHNICAL FIELD

The present disclosure relates generally to a fluid circulation monitoring system, and more particularly to a pool pump monitoring and control system and to a forced air monitoring and control system.

BACKGROUND

Conventional swimming pools and spas include a water circulation system with a pump and a filter for filtering particles and debris from the pool or spa water. The water is usually chemically treated to kill bacteria and algae in the water. The water circulation system ensures that chemicals which have been added to the water are evenly distributed throughout the pool.

Pool pumps are usually powered by an electric motor. The electric motor is commonly connected to a timer which turns the motor on and off at predetermined times. Most often, the timer is set by an end user based on a recommended motor run-time of e.g. 8 hours per day. The motor run time is selected to ensure adequate filtration of the pool without any consideration of actual circulation flow rate and total circulation need. Consequently, pool pumps often run longer than necessary and waste energy.

A forced-air central heating or cooling system is one which uses air as its heat transfer medium. These systems rely on ductwork, vents, and plenums for air distribution. A return plenum carries the air from return grills (vents) to a central air handler for heating or cooling. The supply plenum directs air from the central unit to rooms which the system is designed to heat or cool. Regardless of type, all air handlers include an air filter, a blower, a heat exchanger, and controls.

SUMMARY

A sensor for monitoring a forced air monitoring system includes a pressure sensor. The pressure sensor is arranged within a housing and in fluid communication with an air duct of a forced air heating or cooling system. A processor is operatively connected to the pressure sensor. The processor is configured to detected a sudden change in pressure and associate a change in operating status of the forced air heating or cooling system with the sudden change in pressure. The processor is further configured to associate a magnitude of the sudden change in pressure with a state of health of a filter arranged within the air duct.

The housing may comprise a first housing compartment and a second housing compartment. The first housing compartment may be sealed airtight relative to the second housing compartment. The air pressure sensor may be arranged in the first housing compartment and the processor may be arranged in the second housing compartment. The second housing compartment may include an opening for a connector.

The processor may include a non-volatile memory. At least one of a minimum sudden pressure change value and a maximum sudden pressure change value may be stored within the non-volatile memory. The processor may be configured to determine the state of health of the filter by comparing the detected sudden change in pressure with the stored minimum sudden pressure change value or the stored maximum sudden pressure change value. The processor may be configured to determine and store the at least one of a minimum sudden pressure change value and a maximum sudden pressure change value by evaluating the detected sudden change in air pressure over the course of several days.

The processor may be operatively connected to a wireless communication module and configured to communicate a deteriorated state of health of the filter to a user.

The pressure sensor may be in fluid communication with the air duct of the forced air heating or cooling system downstream of the filter and upstream of a blower motor arranged within the air duct.

The sudden change in pressure may be detected if the pressure at the pressure sensor changes more than 0.25 mbar within 60 sec, e.g. by 0.4 mbar within 30 sec.

A method for monitoring a forced air heating or cooling system, includes the following steps:

Providing, within a housing, a pressure sensor and a processor operatively connected to the pressure sensor.

Arranging the pressure sensor to be in fluid communication with an air duct of the forced air heating or cooling system.

Detecting, by the processor in response to a signal received from the pressure sensor, a sudden change in pressure.

Associating a change in operating status of the forced air heating or cooling system with the sudden change in pressure.

Associating a magnitude of the sudden change in pressure with a state of health of a filter arranged within the air duct.

The fluid communication between the pressure sensor and the air duct may be established by drilling a hole into the air duct.

A fluid circulation monitoring system is presented which includes a distributed processing system having a first processor located on-premises near a space filled with a circulating fluid and a second processor located off-premises. The first processor and the second processor are in communication with one another. A sensor is operatively connected to the first processor and senses at least one parameter indicative of a flow rate of fluid through the circulation system. The distributed processing system is configured to process the at least one parameter and derive a volumetric fluid flow rate through a fluid pump which propels the fluid through the circulation system. Pattern recognition is applied to the at least one parameter to detect maintenance events and predict the need for maintenance events.

The monitoring system may be applied to a pool water circulation system as is commonly used in residential and commercial pools. The system monitors the operation of an electric pool pump motor which drives a pool pump. The monitoring system includes a distributed processing system having a first processor located on-premises near the pool and a second processor located off-premises away from the pool. The first processor and the second processor are in communication with one another. A sensor is operatively connected to the first processor and senses at least one electric parameter of the electric power applied to the pool pump motor. The at least one parameter may be a current, a voltage, an apparent power, an active power, a reactive power, or a phase angle. The pool pump motor may be a single phase AC motor, the most commonly type installed in the US today. The distributed processing system is configured to process the at least one parameter of the electric power and derive a volumetric water flow through the pool pump.

The distributed processing system may be configured to detect a maintenance event or a need for a maintenance event by recognizing a characteristic pattern of the at least one parameter of the electric power.

The second processor may be programmed to store and analyze data received from the first processor to recognize a pool filter backwash event. A backwash event may be recognized by pattern recognition. In particular, the distributed processing system may recognize a pool filter backwash event by detecting a pool pump motor activation pattern including at least two pattern elements from the following set of pattern elements:

the pool pump motor being on for longer than a predetermined time $t_{continuous}$,
the pool pump motor being off for longer than a predetermined time $t_{port\_adjust\_min}$ and for less than a predetermined time $t_{port\_adjust\_max}$,
the pool pump motor being on for longer than a predetermined time $t_{backwash\_min}$ and for less than a predetermined time $t_{backwash\_max}$,
the pool pump motor being off for longer than a predetermined time $t_{port\_adjust\_min2}$ and for less than a predetermined time $t_{port\_adjust\_max2}$,
the pool pump motor being on for longer than a predetermined time $t_{rinse\_min}$ and for less than a predetermined time $t_{rinse\_max}$, and
the pool pump motor being on for longer than a predetermined time $t_{continuous2}$.

A pool filter backwash event may be detected if all of the event elements are detected in sequence. A pool filter backwash event may be detected even earlier if a subset of the event elements are detected in sequence.

The distributed processing system may determine a minimally desirable volumetric water flow rate and compare the derived volumetric water flow rate through the pool pump with the minimally desirable volumetric water flow rate to generate a maintenance need signal. The minimally desirable volumetric water flow rate may be determined by executing a calibration routine. The calibration routine may include a step instructing a user to a least partially close a valve within the pool water circulation system. The valve may be an inlet valve upstream on the pool pump or an outlet valve downstream of the pool pump.

The distributed processing system may be configured to generate a dry running pump signal when a characteristic value of the at least one parameter of the electric power is detected. The distributed processing system may issue an alert through a user interface device when a dry running pump signal is present.

A monitoring and control system for a pool pump may include a distributed processing system having a first processor located on-premises near a pool and a second processor located off-premises away from the pool. The first processor and the second processor are in communication with one another. A sensor is operatively connected to the first processor. The sensor is configured to sense at least one parameter of an electric power applied to a pool pump motor which drives the pool pump. A switch for turning the pool pump motor on an off is operatively connected to the first processor. The distributed processing system is configured to process the at least one parameter of the electric power and derive a volumetric water flow through the pool pump.

The distributed processing system may calculate a pool pump run time based on a volume of water to be turned over and based on the derived volumetric water flow through the pool pump. The first processor may turn the pool pump on by closing the switch for the calculated run time and opening the switch after the calculated run time has expired.

The distributed processing system may be configured to receive weather information and adjusts the pump run time based on the received weather information.

The distributed processing system may be configured to generate a filter backwash reminder signal when the volumetric water flow through the pool pump falls below a filter backwash alert value. The distributed processing system may be configured to activate a user interface device when a filter backwash reminder signal is present. The filter backwash alert value may be established by detecting a filter backwash event and storing a numeric value associated with the volumetric water flow through the pool pump before the filter backwash event occurred. The filter backwash alert value may be established by filtering multiple values associating the volumetric water flow through the pool pump before multiple filter backwash events.

DETAILED DESCRIPTION

Figure 1:
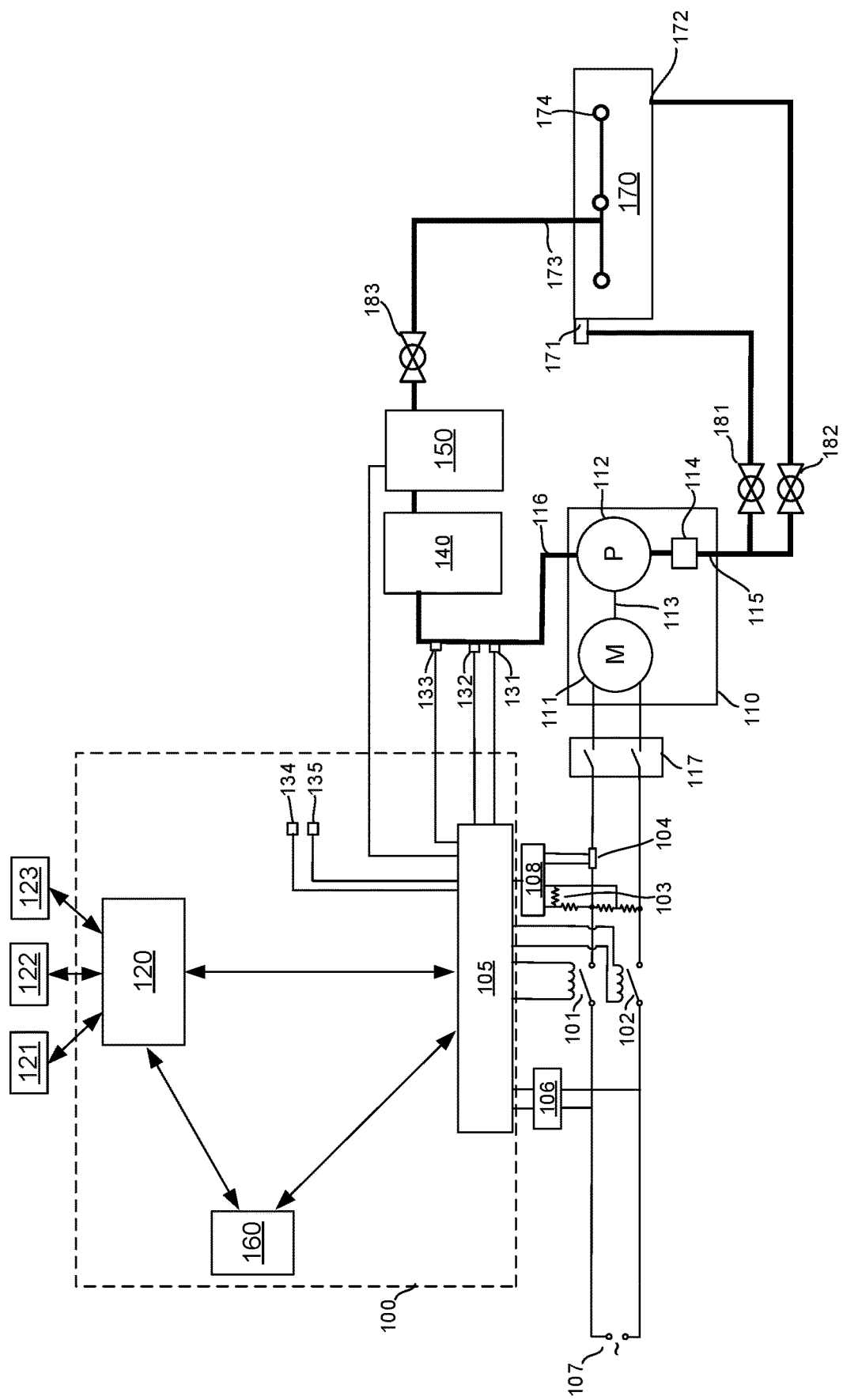
FIG. 1 shows a pool water circulation system and a pool pump monitoring and control system.

FIG. 1 shows schematically a water circulation system for a swimming pool or spa 170. It uses a pool pump 110 which draws water from a suction skimmer 171 and a bottom drain 172 out of the pool 170. The water flows through the pool pump 110, a filter 140, and a heater 150. The water is then returned to the pool through a return line 173 which may terminate in one or more wall-mounted or bottom-mounted return fittings 174.

Flow of water from the skimmer 171 to the pool pump 110 can be controlled by opening and closing a skimmer valve 181. Flow of water from the bottom drain 172 to the pool pump 110 can be controlled by opening and closing a bottom drain valve 182. Flow of water from the pool pump 110 to the return fittings 174 can be controlled by opening and closing an outlet valve 183. The skimmer valve 181 and the bottom drain valve 182 are arranged on the suction side of the pump 110, i.e. upstream of the pump 110. The skimmer valve 181 and the bottom drain valve 182 control the flow of water into the pump. The outlet valve 183 is arranged on the pressure side of the pump 110, i.e. downstream of the pump 110. The outlet valve 183 controls the flow of water out of the pump.

The pool pump 110 comprises an electric motor 111 which is operatively connected to a fluid pump 112 by a shaft 113. The fluid pump 112 may be a rotary impeller pump. A strainer screen or strainer basket 114 is arranged within the pool pump 110 between a water inlet 115 and the fluid pump 112 to collect larger particles, e.g. leaves or larger debris, before reaching the fluid pump 112. The strainer screen or strainer basket 114 must periodically be removed for discharge of the collected leaves and other debris. If too many leaves and/or too much debris accumulates in the strainer screen or basket 114, then the circulation of the pool water will be retarded. In this case, the amount of water flowing through the pump 110 in a given time (the volumetric flow rate) is reduced and so is the total volume of water circulated in a given period of time during which the pump is running.

From an outlet 116 of the pool pump 110 water is pushed through a filter 140 which removes finer particles from the water. The filter 140 may e.g. be a DE (Diatomaceous Earth) type filter; a cartridge type filter or a sand type filter. The most inexpensive of the three kinds of pool filters are the sand filters. This type of filter works by filtering water through a bed of sand. Lateral tubes at the bottom of the sand then separate the clean water from the dirty water. Water is pushed through the filter sand, and as the filter separates the water, the dirty water is sent to the top while the clean water exits through the bottom. Debris can plug up and block sand filters. This causes the pressure in the filter to increase and causes a drop in the flow of water. This can be fixed by running the system in reverse to backwash the filter, leaving it cleaned. The filter is then placed on its rinse mode where it repacks the sand back into the filter. Maintenance on a sand filter can be done manually every couple of weeks to keep the sand filter in proper working order. Sand filters are inexpensive and easy to replace.

A conventional sand filter includes a vessel or tank that holds the sand and other internal parts and includes a multi-port valve or control valve which permits a number of different functions to be selected and performed. For example, the following functions are commonly found on a standard multi-port valve:
  (1) Filter: normal filtering and vacuuming;
  (2) Backwash: for cleaning the filter bed of accumulated debris;
  (3) Rinse: use after completing the backwash cycle to ensure all dirty water is rinsed from the tank to waste;
  (4) Waste: by-passes the tank for draining or lowering the pool water level and for vacuuming heavy debris directly to the waste line;
  (5) Recirculate: water is recirculated through the valve by-passing the filter; and
  (6) Closed: shuts off the flow from the pump to the filter.
The internal parts of the filter include:
  (1) A top diffuser that allows the pool water to enter the tank and distributes the water inside the tank;
  (2) media (sand) that captures the dirt and debris from the pool water as it flows through; and
  (3) laterals that are located under the media and allows the pool water to exit the tank and flow back to the pool.

A water heater 150 may be provided downstream of the water filter 140. A typical water heater 150 employed to heat pool or spa water includes a burner assembly and a heat exchanger assembly enclosed in a housing. A typical burner assembly includes a burner subassembly, a fuel distribution assembly and an igniter. Fuel is supplied to the fuel distribution assembly through a fuel supply line. The fuel is regulated and distributed to the burner subassembly through the fuel distribution assembly. In areas with hot climate the water heater 150 may be replaced with a water cooling system.

A pool monitoring and control system 100 monitors and controls operation of the pool pump 110. The pool monitoring and control system 100 is electrically connected to an electric power source 107, most commonly a home's electrical system. The pool pump can be selectively turned on and off by opening and closing electrically controlled power switches 101,102. The electrically controlled power switches 101,102 are operatively connected to a local processor 105. The electrically controlled power switches 101, 102 may e.g. be contactors, i.e. electromagnetic switches, or solid state power relays. The pool monitoring and control system 100 uses a power supply 106 to provide low voltage direct current, e.g. a 5V or 3.3V supply for the local processor 105 and associated components. A manually operable electric switch 117 may be provided physically close to the pool pump 110 to turn the pump 110 on an off, e.g. to allow for manual maintenance such as cleaning the strainer 114 or backwashing the filter 140.

It is recognized, that pool circulation system are a major consumer of electric energy in homes that have a pool. Increasingly, standard pump motors have been replaced by motors that cost more but produce the same output with approximately 20% greater efficiency. Inexpensive timers have been widely used to limit the pool motor operation to between 8 and 12 hours per day, depending on the volume of the pool and the rate at which the pump circulates pool water through the filter. Some pools also use timers to limit the pool motor operation to "off-peak" hours (typically between 9 p.m. and 6 a.m.) to take advantage of lower electrical rates charged by most utilities during times when system-wide usage is a fraction of the utility's peak generation capacity. These "time of day" controllers reduce the cost of electrical energy but they do not reduce the actual amount of energy required for proper operation of the swimming pool cleaning system. More recently, multiple speed and variable speed motors are replacing single-speed pump motors that operate at a fixed speed of 3450 revolutions per minute (rpm). Variable speed motors allow the pump to be operated at a high rpm when flow requirements are high and at a significantly lower rpm when a lower flow rate is sufficient for long-term functions such as water circulation and filtration. A properly designed variable speed motor will consume less electrical energy at lower speeds than at higher speeds; and, in many cases, the energy savings is disproportionately greater than the reduction in motor speed. For any particular swimming pool, a reduction in the pump run time will produce the greatest amount of energy savings, so long as the reduction in run time does not adversely impact the cleaning, filtration or disinfection functions required for safe and enjoyable long-term use of the pool.

For proper water filtration and treatment of any given swimming pool, it is generally required that a minimum volume of water be circulated through the filter during each 24-hour period. This minimum volume of circulated water in the case of residential pools is generally recognized as being equal to the volume of water in the pool itself. The time required to circulate this volume of water is referred to as the "turnover" time for the particular pool. For an average sized residential pool having a volume of approximately 20,000 gallons, the turnover time would be the time required for the pump to circulate 20,000 gallons through the filter. With a properly sized pump and motor, this turnover time has typically been assumed to require operation of the pump for between 8 and 10 hours each day to assure adequate filtration and treatment of the water. It has also been recognized that the total amount of time required for adequate filtration can increase or decrease for any particular pool depending on how heavily it is used, the time of year and weather conditions that affect the cleaning load on the pool.

The run time of the pool pump is typically selected based on a nominal turnover time, which assumes a nominal water flow through the pool's circulation system. However, in practice, the water circulation can be greatly affected by debris in the pool pump strainer 114 and the pool filter 140. A 20,000 gallon pool having a circulation system that has a nominal flow rate of 2,500 gallons per hour has a nominal turnover time of 8 hours. In practice, the flow rate may however be reduced to 2,000 gallons per hour, thus causing the actual turnover time to be 10 hours. Today's pool pump control systems fail to account for the actual flow rate of water through the circulation system. The run time of pool pumps is often too long when the strainer 114 and filter 140 are clean, which wastes energy. The run time on the other hand is too short when the strainer 114 or filter 140 are blocked, leading to inadequate filtration of the pool water. Traditional pool circulation systems require a user to constantly monitor the strainer 114 and filter 140 for blockage and do not provide any form of alert when maintenance is required.

Our improved pool monitoring and control system 100 addresses this shortcoming of traditional systems. The control system 100 comprises a voltage monitor 103 and a current monitor 104 to measure voltage (V) and current (I) to the pool pump motor 111. The voltage monitor 103 may be a potential transformer or a resistive voltage divider which is operatively connected to the local processor 105. The current monitor 104 may be a shunt resistor, a current transformer, or a Hall Effect current sensor which is operatively connected to the local processor 105. The pool pump motor 111 is most commonly a single phase 110-120V or 220-240V AC induction motor. The electric power consumed by the motor is related to the pump's volumetric flow. By measuring the motor voltage (U) and current (I) it is possible to deduct the pump's volumetric flow rate (V) of water and accordingly adjust the pump run time to maintain a desired volume of water to be filtered without relying on just nominal flow rates.

The pool pump motor 111 consumes apparent power (S) which comprises active power (P) and reactive power (Q). The phase angle ((p) of the voltage (U) relative to the current (I) determines the ratio of active power to apparent power, which is also referred to as the power factor. Assuming sinusoidal waveforms the power factor is the cosine of the phase angle ((p). The voltage monitor 103 and the current monitor 104 may be operatively connected to a dedicated power/energy IC 108 such as the CS5463 made by Cirrus Logic. The power/energy IC 108 may be connected to the local processor 105 by a serial interface, e.g. SPI or I$^2$C. The power/energy IC 108 may be designed to accurately measure instantaneous current and voltage, and calculate VRMS, IRMS, instantaneous power, apparent power, active power, and reactive power for single-phase, 2- or 3-wire power metering applications.

The control system 100 controls a volume of water to be filtered by selectively adjusting the run time ($t_{on}$) of pool pump motor 111 to obtain a desired turnover volume V.

$$t_{on} = \frac{V}{\dot{V}}$$

The volumetric flow rate ($\dot{V}$) of water through the pump may be determined as a function of voltage, current and phase through the electric pool pump motor 111.

$$\dot{V}=f(U,I,\varphi)$$

Additionally or alternatively the volumetric flow ($\dot{V}$) of water through the pool circulation system may be measured with flow sensor 132,133. The flow sensor 132,133 is operatively connected to the local processor 105. The flow sensor may be an ultrasonic flow sensor based on a run time measurement of an ultrasonic signal traveling in the moving water between a first ultrasonic sensor 132 and a second ultrasonic transceiver 133 or vice versa from the second ultrasonic transceiver 133 to the first ultrasonic transceiver 132. Alternatively or additionally a frequency shift (Doppler Effect) measurement may be used to determine the speed of water flowing through a pipe between the ultrasonic transceivers 132,133. The flow sensor 132,133 may also be an electromagnetic flow meter or a thermal mass flow meter.

The flow sensor 132,133 may alternatively be on one or more pressure sensors. For example, a first pressure sensor may be arranged upstream of the pump 110 and indicate the water pressure on the suction side of the pump 110. A second pressure sensor may be arranged downstream on the pressure side of the pump. The local processor 105 may receive water pressure measurements from both the upstream and the downstream side of the pump 110 and may calculate the volumetric flow ($\dot{V}$) of water through the pool circulation system based thereon.

In yet another alternative arrangement a single differential pressure sensor may be provided which is hydraulically connected to both the upstream and the downstream side of the pump and electrically connected to the local processor 105. The local processor 105 may receive a differential water pressure measurement and may calculate the volumetric flow ($\dot{V}$) of water through the pool circulation system based thereon.

The monitoring system 100 may compare the actual volumetric flow rate ($\dot{V}$) with a minimal acceptable flow rate ($\dot{V}_{min}$) to determine if the actual flow rate ($\dot{V}$) has fallen below an acceptable level. If the actual flow rate ($\dot{V}$) is less than the minimal acceptable flow rate ($\dot{V}_{min}$) a maintenance need alert signal may be generated, indicating that cleaning of the strainer 114 or backwashing the filter 140 is required. The alert signal may be communicated through a user interface device 160 to the homeowner or a pool service company.

The local processor 105 may be communicating with a server 120 to create a distributed control system. For example, the local processor 105 may periodically transmit sensor data to the server 120. The sensor data may comprise current information from current sensor 104, voltage information from voltage sensor 103 and phase information derived by the local processor 105 by comparing voltage and current over time. The local processor 105 may also transmit pre-processed information to the server 120, e.g. information that, over time, voltage, current, or phase have changed more than a predetermined absolute or relative value. The local processor 105 may e.g. communicate to the server 120 that the amplitude of current (I) through the current sensor 104 has changed by more than 0.1 A or by more than 1%. A determination whether the volumetric flow of water through the pump has deteriorated may be made by the server 120 based on information received from the local processor 105. The local processor 105, the server 120, and the user interface device 160 may each contain one or more electronic processors such a microprocessors or microcontrollers and jointly form a processing system capable of applying algorithms to inputs in order to compute outputs. The server 120 may be referred to as a second processor which is located off-premises.

Estimates suggest that there are more than 4.5 million in-ground pools, 3.5 million above ground pools and 5 million spas in the United States. These pools vary widely in water volume, and utilize pool pumps made from various manufacturers. It is therefore not practical to specifically design a pool pump monitoring and control system 100 for a particular pool or pool pump. The pool monitoring and control system 100 is rather self-learning and automatically adapts to different pools and pool pumps. It does so by tracking, storing and analyzing sensor data over several days. The pool monitoring and control system 100 may automatically detect maintenance events, e.g. that debris was removed from the strainer 114 by analyzing voltage and current of pool pump motor 111. Removal of debris from the strainer 114 can e.g. be detected based on the following profile:

- a first motor current $I_1$ for longer than $t_{continuous}$ seconds
- a motor current of 0 for more than $t_{strainer\_min}$ and less than $t_{strainer\_max}$ seconds.
- a second motor current $I_2$ for longer than $t_{continuous}$ seconds This current profile suggests that a user has manually turned off power to the pool pump 110 by turning off the manual switch 117. In this example $t_{continuous}$ may be about 600 seconds—generally suggesting a longer period of pool pump operation. $T_{strainer\_min}$ may be about 30 seconds and $t_{strainer\_max}$ may be 600 seconds, suggesting that a user took between 0.5 and 10 min to clean the strainer 114. The first motor current $I_1$ and its associated phase $\varphi_1$ may be stored in the local processor 105 or the server 120 to learn which current is characteristic for a blocked strainer 114. The second motor current $I_2$ and its associated phase $\varphi_2$ may be stored in the local processor 105 or the server 120 to learn which current is characteristic for a clean strainer 114. Knowledge about characteristic motor currents and/or current phases may be learned continuously over many cleaning cycles.

Similarly, backwashing of the filter 140 is another maintenance event which may be detected by analyzing pump current over time. Backwashing requires adjustment of a multiport valve, which can only be done while the pool pump 110 is turned off. A typical backwash cycle will thus start by a user briefly turning off the pool pump 110 using the manual switch 117 to adjust the multiport valve to the backwash setting. The user may then turn the pump 110 back on for 0.5-3 minutes, the recommended time to backwash a filter. The user will then turn the pump off to adjust the multiport valve to a rinse setting, which is followed by turning the pump on for 1-2 minutes while rinsing the filter. The user will then turn the pump off to adjust the multiport valve to the filter setting, followed by an extended period of normal operation.

A typical filter backwash may thus be identified by the following current profile:

- a first motor current $I_1$ for longer than $t_{continuous}$ seconds (indicating normal filtering operation)
- a motor current of 0 for more than $t_{port\_adjust\_min}$ and less than $t_{port\_adjsut\_max}$ seconds
- a motor current>0 for more than $t_{backwash\_min}$ and less than $t_{backwash\_max}$ seconds
- a motor current of 0 for more than $t_{port\_adjust\_min}$ and less than $t_{port\_adjsut\_max}$ seconds
- a motor current>0 for more than $t_{rinse\_min}$ and less than $t_{rinse?max}$ seconds
- a second motor current $I_2$ for longer than $t_{continuous}$ seconds.

The first current $I_1$ and its associated phase angle $\varphi_1$ and the second current $I_2$ and its associated phase angle $\varphi_2$ may be stored in the local processor 105 and/or the server 120 to learn characteristic current and phase angle values associated with a filter that needs to be cleaned. Over time, the characteristic current and phase angle values before and after backwashing the filter 140 can be used to identify when the strainer 114 and/or the pool filter 140 need to be cleaned, even if it may not be possible to determine the absolute volume flow of water through the pool pump 110. Determining the relative flow rate of water through the pump 110 compared with the flow rate just after cleaning the filter 140 is sufficient to determine when the user should be alerted that pool maintenance is required.

The pool monitoring and control system 100 may learn characteristic values for current (I), phase angle ($\varphi$), apparent power (S), active power (P), reactive power (Q), and power factor (PF) associated with volume flow ($\dot{V}$) through pool pump 110 over the course of several days or weeks. The association of electrical characteristics with volume flow may be accelerated by calibration processes as illustrated in FIG. 3a, FIG. 3b, and FIG. 3c.

Figure 3A:
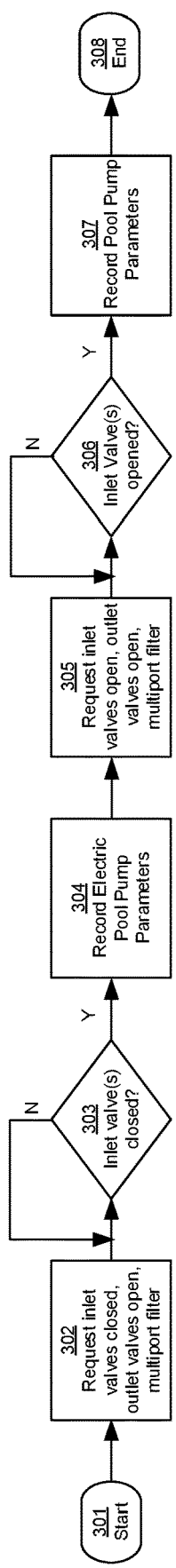
FIG. 3a is a diagram showing steps of a calibration method.

FIG. 3a shows an activity diagram illustrating a method to determine electrical characteristics indicative of a reduced flow of water into the pool pump. This method can be used to simulate a (partially) blocked pool pump strainer 114 in need of cleaning. The method starts with step 301. In step 302 a user is asked to close inlet valves. This step may be performed by providing instructions to the user to close the skimmer valve 181 and the bottom drain valve 182. The instructions may be provided to the user through a user interface device 160. The user interface device 160 may be a smartphone. Step 303 waits for the inlet valve to be closed. This step may be performed by requiring the user to provide affirmative feedback through the user interface device 160. Alternatively, step 303 may be automatically performed by monitoring the electrical characteristics of the pool pump motor, detecting a change in the electrical characteristics, and waiting for the electrical characteristics to stabilize at a new level. In step 304 electric pool pump parameters may be recorded, e.g. by measuring and storing in a non-volatile memory one or more parameters associated with reduced water inflow (RI). The stored parameters may be one or more of the current ($I_{RI}$), phase angle ($\varphi_{RI}$), apparent power ($S_{RI}$), active power ($P_{RI}$), reactive power ($Q_{RI}$), and power factor ($PF_{RI}$) measured while the inlet valve is closed. The user interface device 160 may instruct the user to completely close all inlet valves 181,182 so that the volume flow ($\dot{V}$) becomes zero. Alternatively, the user interface device 160 may instruct the user to partially close the inlet valves 181,182 so that the volume flow ($\dot{V}$) is reduced to a value which simulates a partially blocked pool pump strainer 114 in need of cleaning.

In step 305 the method may instruct the user to reopen the inlet valve, wait for confirmation that the inlet valve has been opened in step 306, and record a normal operation comparison value of the parameters recorded in step 307 for comparison purposes. The method ends in step 308.

Figure 3B:
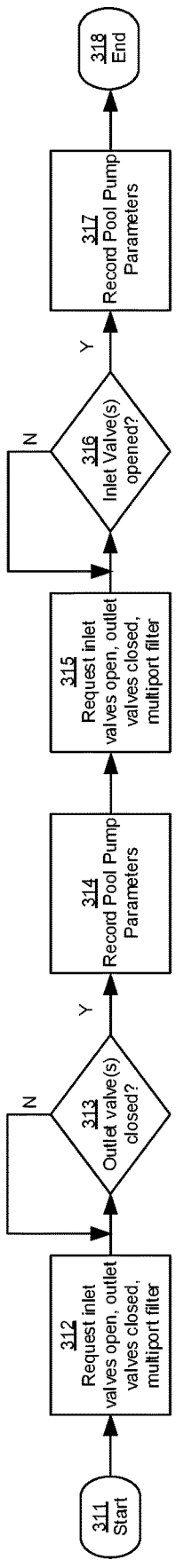
FIG. 3b is a diagram showing steps of a further calibration method.
Figure 3C:
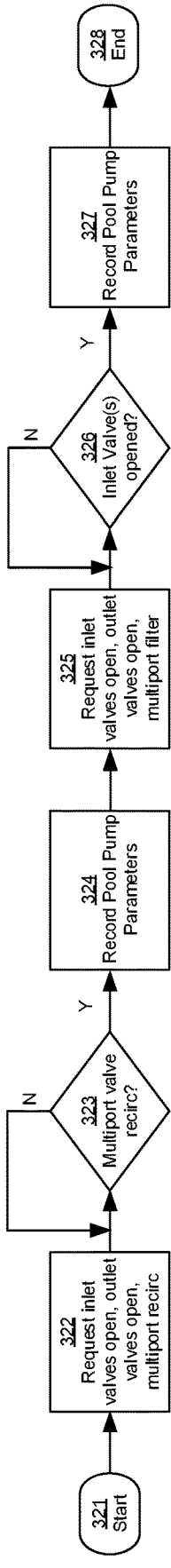
FIG. 3c is a diagram showing steps of yet another calibration method.

FIG. 3b shows an activity diagram illustrating a method to determine electrical characteristics associated with reduced flow of water out of the pool pump. This method can be used to simulate a (partially) blocked pool filter 140 in need to being backwashed or otherwise cleaned. The method starts with step 311. In step 312 the user is asked to close outlet valves. This step may be performed by providing instructions to the user to close the outlet valve 183, e.g. through the user interface device 160. Step 313 waits for the outlet valve to be closed. This step may be performed by requiring the user to provide affirmative feedback through the user interface device 160. Alternatively, step 313 may be automatically performed by monitoring the electrical characteristics of the pool pump motor, detecting a change in the electrical characteristics, and waiting for the electrical characteristics to stabilize at a new level. In step 314 electric pool pump parameters may be recorded, e.g. by measuring and storing in non-volatile memory one or more parameters associated with reduced water outflow (RO). The stored parameters may be one or more of the current ($I_{RO}$), phase angle (($\varphi_{RO}$), apparent power ($S_{RO}$), active power ($P_{RO}$), reactive power ($Q_{RO}$), and power factor ($PF_{RO}$) measured while the outlet valve is closed. The user interface device 160 may instruct the user to completely close all outlet valves 183 so that the volume flow ($\dot{V}$) becomes zero. Alternatively, the user interface device 160 may instruct the user to partially close the outlet valve 183 so that the volume flow ($\dot{V}$) is reduced to a value which simulates a partially blocked filter 140 in need of cleaning. Often, pool filters are provided with a pressure gauge. High pressure in the filter may indicate a need for cleaning the filter. The user interface device may ask the user in step 312 to close the outlet valve 183 slowly and observe rising pressure within the pool filter 140 until the pressure in the pool filter has reached a level where the user would typically clean the filter 140.

In step 315 the method may instruct the user to reopen the outlet valve, wait for confirmation that the inlet valve has been opened in step 316, and record a normal operation comparison value of the parameters recorded in step 317 for comparison purposes. The method ends in step 318.

FIG. 3c shows an activity diagram illustrating a method to determine electrical characteristics associated with unobstructed flow of water through the pool pump. This method can be used to identify the maximum possible flow of water through the circulation system when the pool filter 140 is circumvented. The method starts with step 321. In step 322 the user is asked to switch a multiport valve into the "recirculation" position such that the water flows around the pool filter 140 instead of through it. This step may be performed through the user interface device 160. Step 323 waits for the multiport valve to be switched to "recirculation". This step may be performed by requiring the user to provide affirmative feedback through the user interface device 160. Alternatively, step 323 may be automatically performed, e.g. by detecting that the current drops to zero when the user manually switches the pool pump off to adjust the multiport valve and thereafter switches the pool pump back on. In step 324 electric pool pump parameters may be recorded, e.g. by measuring and storing in non-volatile memory one or more parameters associated with unobstructed water flow (UF). The stored parameters may be one or more of the current ($I_{UF}$), phase angle ($\varphi_{UF}$), apparent power ($S_{UF}$), active power ($P_{UF}$), reactive power ($Q_{UF}$), and power factor ($PF_{UF}$) measured while the outlet valve is closed.

In step 325 the method may instruct the user to switch the multiport valve back to the "filter" setting, wait for confirmation that the multiport valve has been adjusted in step 326, and record a normal operation comparison value of the parameters recorded in step 324 for comparison purposes. The method ends in step 328.

A calibration experiment was performed using an in-ground swimming pool. The pool circulation system was powered by a Century SQ1152 electric motor. The motor has a power rating of 1.5 HP, a maximum load current of 10.4 A, and is rated at 230 V. It was found, that a maintenance event such as cleaning the strainer or backwashing the filter coincided with an increase in apparent power, and increase in active power, and an increase in $\cos(\varphi_{UF})$. The parameters of the current flowing through the pool pump have been found to be indicative of a maintenance event and can therefore be used to predict the necessity of maintenance.

Figure 3D:
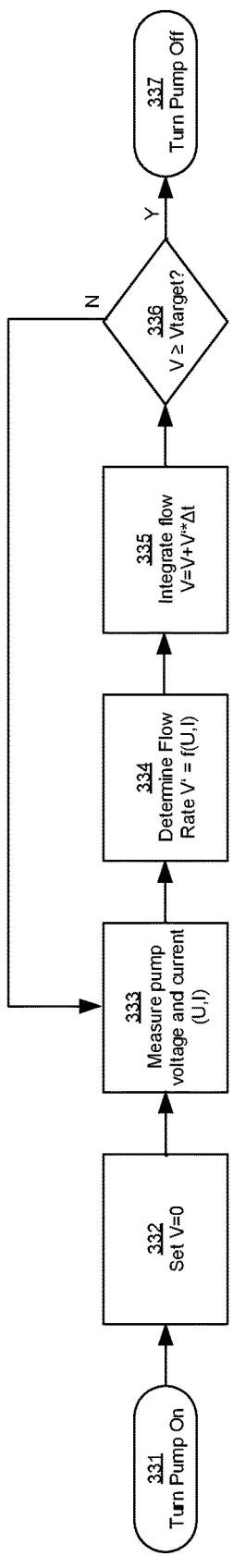
FIG. 3d is a diagram showing a method for operating a pool pump.

FIG. 3d shows an activity diagram illustrating a method to control a pool pump such that it runs until a predetermined target volume of water has been circulated. In a first step 331 the pool pump is turned on. A variable tracking the volume of water that has been turned over is initialized with zero in step 332. The method then enters a loop comprising steps 333 through step 336. In step 333, the electric voltage applied to the pump motor and the electric current flowing through the pump motor are measured. In step 334 a volume flow rate V' is calculated based on voltage and current measured in the previous step. The flow rate V' is integrated in step 335. This is typically done by adding V'*Δt to the variable V. Δt is the cycle time of the loop 333-336. In step 336 the volume of water V that has been turned over since the start of the cycle in step 331 is compared with a target volume $V_{target}$. If the turned over volume is below the target volume the loop is reentered at step 331. If the turned over volume V has reached the target volume $V_{target}$ the method ends in step 337 in which the pool pump is turned off.

The pool monitoring and control system 100 may, in a simple embodiment, not be able to control the pump 110 but rather monitor its current and voltage to provide a signal when maintenance is required. In this embodiment, contactors 101,102 are not present.

In a more complex embodiment, the pool monitoring and control system 100 may not only control a target volume of water to be circulated, but adjust that target volume based on additional inputs. This allows for even more optimized pool pump operation, accounting for the fact that the volume of water that should be circulated depends on many different factors. For example, to prevent growth of algae it is useful to estimate the exposure of the pool to sunlight. To estimate the amount of debris present in the pool it is helpful to know whether it rained, since rain may wash debris into a pool which may cause a need for additional filtration. It is further useful to know how long and to what intensity a pool has been used, as users may cause bacteria, viruses, or debris to enter the pool.

The pool monitoring and control system 100 may process several different inputs to estimate how much water should be circulated. A water temperature sensor 131 may be provided and operatively connected to the local processor 105. Generally, the warmer the pool, the more water should be circulated. A look-up table may be provided in the local processor 105 or the server 120 to associate a target volume of water circulation (turnover volume) with a pool water temperature.

The pool monitoring and control system 100 may obtain weather information 121 (present, past or forecasted) to determine a weather-based adjustment of target volume circulation. The weather information 121 may comprise sunrise time, sunset time, cloud coverage, UV index, air temperature, and precipitation information. Weather information 121 may in particular be obtained from a web service using a standardized API. The weather information 121 should be localized, i.e. the weather information 121 should relate to the geographic location of the pool. This is achieved by storing information related to the geographic location of the pool in the server 120 and/or the local processor 105. The geographic location information may be the postal address of the property on which the pool is located, the ZIP code in which the pool is located, or the latitude and longitude of the pool's location.

The pool monitoring and control system 100 may utilize weather information 121 to determine an outside air temperature below freezing and operate in a freeze protection mode in response thereto. The pool pump control system may obtain a weather forecast or actual weather information via its server 120, e.g. information from the National Digital Forecast Database (NDFD) through a Simple Object Access Protocol (SOAP) web service. If the weather forecast or the actual weather information indicates a risk of freezing, the pool monitoring and control system 100 may turn on the pool pump 110 to run during cold periods in which standing water might freeze and damage the pool circulation system. The pool monitoring and control system 100 may communicate location information by providing an address, a zip code, or latitude and longitude to the server 120 to obtain weather information specifically for the location where the pool monitoring and control system 100 is installed.

The pool monitoring and control system 100 may also communicate with an electric utility provider 122 and allow the electric utility provider 122 to identify times of peak electricity demand at which the pool pump 110 should be turned off. In return for granting the electric utility provider 122 the option to remotely disable the pool pump 110 during times of peak electricity demand the utility provider may offer a lower electricity rate. Information obtained from the electric utility provider 122 may include rate information, associating a time of day with a cost. The pool monitoring and control system 100 may adjust the pool pump run time based on the cost information obtained from the electric utility provider 122 to minimize operating cost of the pool pump 110.

The pool monitoring and control system 100 may further communicate with a pool service provider 123. The pool monitoring and control system 100 may provide information relating to the water throughput of the pool pump 110, state of health information relating to the strainer 114 and/or the filter 140 to the pool service provider 123. The pool service provider 123 may use information obtained from the pool monitoring and control system 100 to provide customized service instead of providing service based on a fixed schedule. For example, the pool service provider 123 may extend or shorten an interval between two cleaning maintenance events based on information obtained from the pool monitoring and control system 100.

The pool monitoring and control system 100 may operate in different modes. In a "timer mode" the pool pump control system may mimic a traditional timer, turning the pool pump on and off at predetermined times. In a "water volume mode" the pool pump control system may turn the pump 110 on at a predetermined time, and adjust the run-time of the pump based on estimated or measured volume flow of water through the pump 110 to guarantee a predetermined amount of water to be circulated. In a "smart mode" the pool monitoring and control system 100 may determine the volume of water to be circulated based on additional inputs as described above.

One input of particular interest in determining the required volume of water to be filtered relates to the usage of a pool. If used lightly or not at all, less water needs to be filtered than if the pool is used more heavily or over a longer time period. Determining the usage of the pool may be accomplished by allowing the owner to enter the usage through user interface device 160. User interface device 160 may e.g. be a smartphone, a tablet computer or the like and communicate wirelessly, e.g. through a cellular phone network, Bluetooth, WiFi, Zigbee or the like, with the local processor 105 and/or the remote server 120. The user interface device may in particular offer an option to enter pool usage by quickly selecting a button associated with "light", "moderate", or "heavy" usage.

Figure 2:
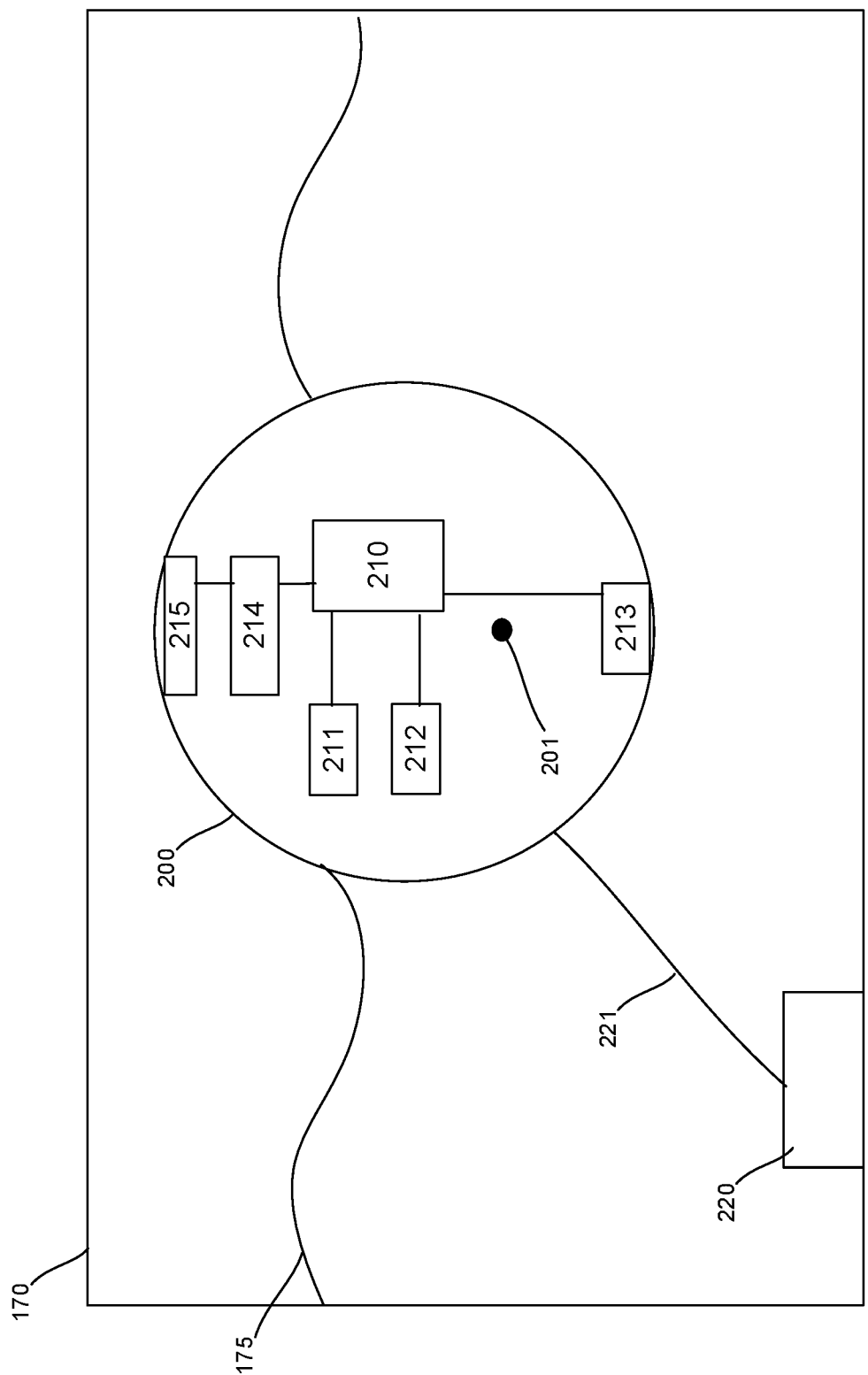
FIG. 2 shows a pool usage sensor.

Pool usage may be determined automatically without a need for manual data entry by a pool occupancy sensor 200 as shown in FIG. 2. The pool occupancy sensor 200 may be floating on the water surface 175 within the pool 170. The pool occupancy sensor 200 may be tethered to an anchor 220 by a rope 221. The anchor 220 may e.g. be a weight that is placed on the bottom of the pool. The anchor 220 may also be a suction cup mounted to a side wall of the pool. The anchor 220 can prevent the pool occupancy sensor 200 from being sucked into the skimmer 171 of the pool when the pool pump 110 is running.

The pool occupancy sensor 200 may have a center of gravity 201 that is eccentrical relative to a center of lift, thereby providing a predetermined orientation of the pool occupancy when floating. The pool occupancy sensor 200 may comprise a battery 211 which powers a processor 210. The processor 210 may be operatively connected to an acceleration sensor 212. The processor 210 may further be connected to a radio transmitter or transceiver 214, the radio transmitter or transceiver 214 being connected to an antenna 215. The antenna 215 may be arranged within the pool occupancy sensor 200 above the center of gravity such that the antenna extends above the water surface 175 when the pool occupancy sensor floats on the water. Opposite the antenna 215 on a lower end of the pool occupancy a temperature sensor 213 may be arranged which is submerged in the water when the occupancy sensor 200 floats, thereby allowing the temperature sensor to measure the water temperature in the pool.

By evaluating acceleration sensed by acceleration sensor 212 over time the processor 210 can determine pool usage time and approximate usage intensity. Stronger accelerations caused by waves in the water indicate heavier usage. The pool usage may be communicated from the pool occupancy sensor 200 wirelessly to the user interface device 160, the server 120, the local processor 105, or a combination thereof.

The pool occupancy sensor 200 may operate in a child safety mode. In this mode the pool occupancy sensor may cause the user interface device 160 to issue an alert when an acceleration of the occupancy sensor is detected that is consistent with a child having fallen into the pool 170.

The pool monitoring and control system 100 may utilize pattern detection to recognize events. For example, the pool monitoring and control system 100 may monitor electrical parameters of the pool pump's motor current to identify the presence of a maintenance event. As described above, the pattern may be a characteristic sequence of turning the pump on and off, which may be associated with a change in electrical parameters before and after the event.

While monitoring the motor current is a relatively easy and low cost approach, one skilled in the art will appreciate that the pattern recognition can be applied to other inputs. For example, if equipped with a flow sensor 132/133 or a pressure sensor the pool monitoring and control system 100 may apply a pattern matching algorithm to inputs from those sensors. Patterns may extend over widely different time periods. For example, a pool service maintenance event such a filter cleaning operation may be detected by analyzing inputs over several minutes, e.g. between 0.5 and 10 min. Other events may require larger or shorter periods of time.

The pool monitoring and control system 100 may provide additional features based on detecting anomalies. In particular, the pool pump control system may learn, over the course of several days or weeks, typical motor current parameters and establish a lower threshold and an upper threshold based thereon. For example, the local processor 105 or the server 120 may be programmed to calculate a lower threshold of an electric parameter, such as motor current, and store an associated numeric value in a non-volatile memory. An observation of a motor current below the stored lower threshold indicates an anomaly.

The anomaly detection may be used to protect a pool pump 110 from permanent damage if the fluid pump 112 is running dry. The pool monitoring and control system 100 may be programmed to detect a dry running pool pump 110 based on pool pump electric current characteristics outside of a learned normal operating envelope. In particular, a dry running pump 112 may be detected by its motor 111 consuming significantly less than typical power. When detected, the pool pump control system may alert a user through a user interface 160 and/or may turn off the pool pump by opening switches 101,102 automatically.

The anomaly detection may also be used to protect a pool pump motor 111 from permanent damage if the electric motor 111 fails to start. A motor that fails to start may be detected by a characteristic high starting current extending longer than usual, followed by a drop of current to zero as the motor 111 overheats and switches off. This pattern typically repeats frequently. When the pattern is detected, the pool pump control system may alert a user through a user interface 160 and/or may turn off the pool pump 110 by opening switches 101,102 automatically.

The pool monitoring and control system 100 may comprise further local sensors operatively connected to the local processor 105. For example, the pool monitoring and control system 100 may include a local air temperature sensor 134 and a sun intensity sensor 135. The local sensors 134,135 may substitute or augment information obtained from a weather service provider 121.

The pool monitoring and control system 100 may utilize switches 101,102 to selectively turn the pool pump 110 on and off. Preferably, the voltage monitoring 103 and current monitoring circuit 104 is connected to the supply lines on the pump side of the switches 101,102. This allows the pool monitoring and control system 100, through its local processor 105, to monitor proper operation of the switches 101,102. If one of the switches is stuck, the local processor 105 will register a voltage on the motor-side of the switches 101,102 which should not be present. This may be caused e.g. by a stuck relay. The pool monitoring and control system 100 may be programmed to alert a user to this malfunction by issuing an alert through the user interface 160.

Through its user interface 160 the pool pump control system 100 may ask a user to annotate detected events to further improve future event detection. For example, the user interface 160 may provide a display asking a user to enter whether a recent event in which the pool pump was manually switched off was related to a filter backwash, related to removal of debris from the strainer, or unrelated to maintenance.

The pool monitoring and control system 100 may control the pool heater 150 and may be programmed to maintain a desired pool temperature. Since water can only be heated and cooled while circulating, the pool monitoring and control system 100 may be programmed to maintain circulation irrespective of a filtering need to reach a desired temperature. The pool monitoring and control system 100 may learn the specific heating performance of the pool heater 150. For example, the pool monitoring and control system 100 may store data in a non-volatile memory associating a temperature rise per time period when the heater 150 is on and water is circulating. The pool monitoring and control system 100 may comprise a look-up table with a plurality of numeric values which have been established by prior observation of the heating performance for a specific pool. The data stored in the look-up table may be multi-dimensional to consider additional factors. The pool-pump control system may e.g. store data associating temperature rise over time with the pool water temperature as received from a temperature sensor 131, with exterior temperature as received from a weather service 121, and with sun intensity or cloud coverage data as received from a weather service 121.

The pool monitoring and control system 100 may provide a user interface allowing a user to select a desired target temperature of the pool at a given time. The pool monitoring and control system 100 may be programmed to compare the target temperature of the pool at the given time with the present temperature, calculate a temperature delta, look up a heating performance value of the given pool, and calculate the amount of time required to heat the pool to the desired temperature. The pool monitoring and control system 100 may then activate the pump 110 and the heater 150 at the calculated time period before the target time to raise the temperature of the pool to the desired level at the desired time. The same applies to cooling a pool using a pool cooling system instead of a heater 150.

For example, a user may set, through a user interface, a desired pool temperature of 30° C. at 9 a.m. The pool control system 100 monitors the pool water temperature using a temperature sensor 131. The temperature sensor may indicate that the pool water has a temperature of 27° C. The pool monitoring and control system 100 may receive information from a weather service 121 that the ambient temperature at the pool is 25° C., that sunrise is at 6:35 am, and that the sky is overcast. The pool monitoring and control system 100 may look up a learned heating performance value of 0.8°/h given the ambient environment of 25° C. and overcast sky. The pool pump control system then calculates a time of (30°−27°)/0.8°/h=3.75 h that is needed to heat the pool from its present temperature to the desired 30° C. The pool pump control system thus activates the pool pump 110 and the heater 150 at 9 a.m.−3.75 h=6.15 a.m.

The pool control system 100 may offer a user, through the user interface 160, to temporarily override automatic controls. For example, the user interface 160 may allow a user to activate a "24 h run" that keeps the pool pump active for a period of 24 h. Such a 24 h run mode may be desired following an application of chemicals to the pool which requires continued water circulation to distribute the applied chemicals. The user interface may provide a single-button option to activate a preset time period of manual override (such as 24 h) or allow the user to adjust the time period of the manual override (e.g. in increments of 30 min). Similarly, the user interface 160 may provide an option to delay pump activation for a given period of time.

Variable speed pool pumps are increasingly used for their energy savings over fixed speed pool pumps. A variable speed pool pump may be operated such that it runs 24/7, adjusting the pump's speed to account for different turnover volume. The pool monitoring and control system 100, when connected to a variable speed pump, may communicate with the pump motor 111 through a serial data signal. The pool monitoring and control system 100 may utilize external weather information 121 to adjust the turnover volume without affecting the run time of the pump.

Figure 4:
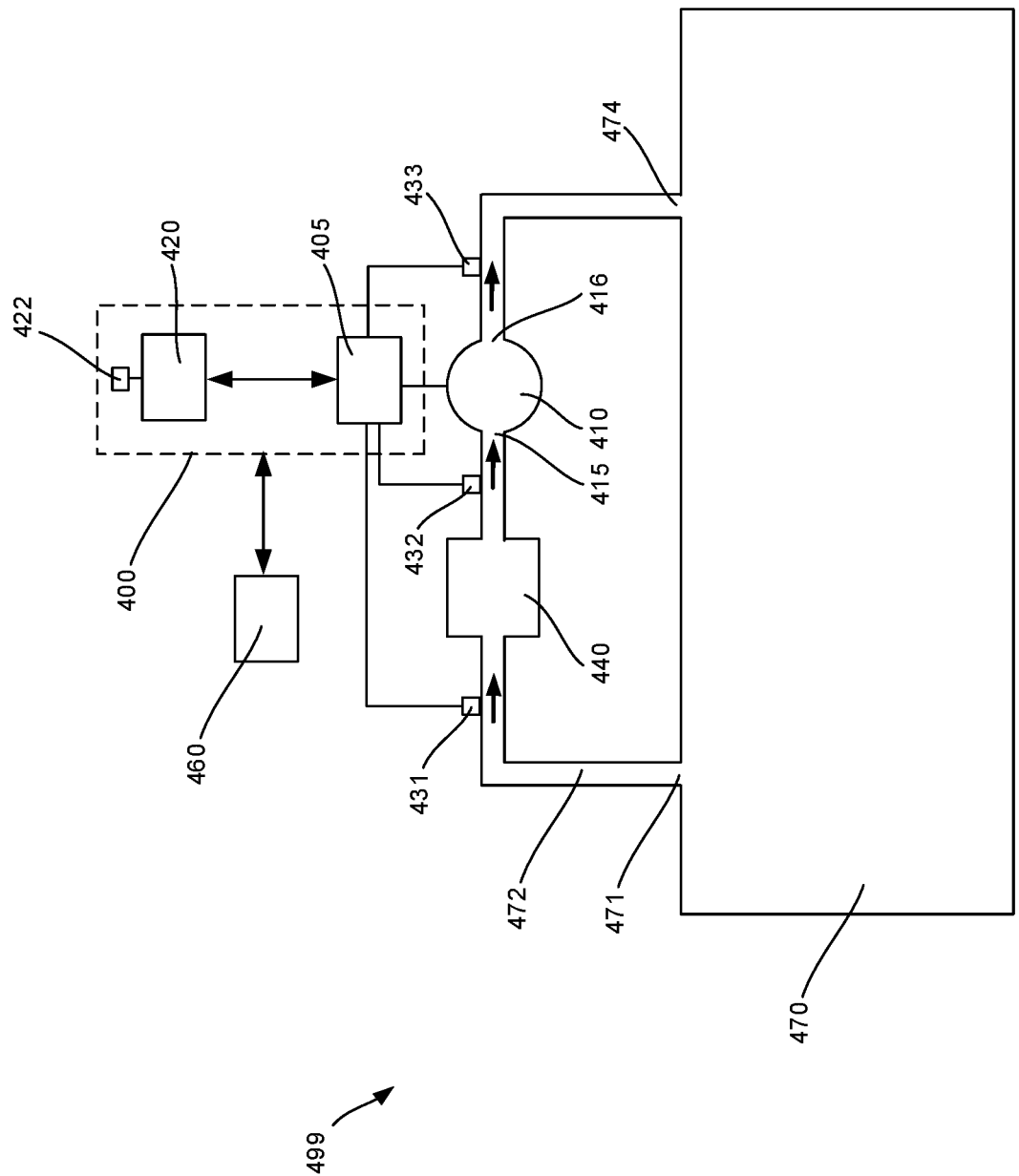
FIG. 4 is a schematic illustration of a fluid circulation monitoring system.

Shown in FIG. 4 is a schematic illustration of a fluid circulation system 499. A space 470 is filled with a fluid. The fluid may be a gas or a liquid. Fluid is sucked through an inlet opening 471 into a fluid channel 472. The fluid channel 472 may e.g. be a pipe, or a duct. The fluid flows through a fluid conditioning device 440. The fluid conditioning device may be a stand-alone filter, or a heating and/or cooling device which may include a filter component. A fluid pump 410 sucks fluid from an inlet opening 415 and pushes the fluid through an outlet opening 416. The fluid re-enters the space 470 through an outlet 474. The fluid pump 410 may be a fan in applications where the fluid is a gas.

A distributed monitoring and control system 400 is operatively connected to the fluid pump 410 and to one or more sensors 431,432,433. The distributed monitoring and control system 400 uses a first processor 405 which communicates with a second processor 420. The first processor is physically located on-premises, arranged close to the space 470 and the fluid pump 410. The second processor is physically located off-premises, arranged typically in a server in a data center far from the space 470.

The first processor and/or the second processor has access to a non-volatile memory 422. The non-volatile memory may for example be a flash memory, EEPROM, an optical memory storage device or a magnetic memory storage device such as a hard disk drive.

The distributed monitoring and control system 400 communicates with an operator through a user interface device 460. The user interface device 460 may e.g. be a display and button arrangement that is operatively connected to the first processor 405. It may also be a hand-held device being in communication with the second processor 420.

Data from the sensors 431,432,433 is read into the first processor 405. The sensor data may be processed within the first processor 405 and processed sensor data may be communicated from the first processor 405 to the second processor 420. Processing of the sensor data within the first processor 405 may include filtering of sensor data, averaging of sensor data, and detecting changes within the sensor data. The processed data communicated from the first processor 405 to the second processor 420 may include filtered sensor data, averaged sensor data, compressed sensor data, or events related to sensor data. The sensors 431,432,433 may include temperature sensors, pressure sensors, and flow sensors.

The distributed monitoring and control system 400 is designed to be used with numerous different fluid circulation systems 499, none of which has exactly the same characteristics as another. For example, the system may be applied to a home heating application. In that case the fluid circulation system 499 is a forced air heating or cooling system and the space 470 are rooms within a building. The term "heating or cooling system" may refer to a heating-only system, a cooling-only system, or a combined heating and cooling system. The fluid conditioning device 440 is the home's furnace including an air filter. A task for the distributed monitoring and control system 400 may be to detect the degree to which an air filter has been blocked so as to advise a user through the user interface device 460 that it is time to change the air filter at the furnace 440. The distributed monitoring and control system 400 may utilize a pressure sensor 431 to determine the degree to which the air filter is blocked. However, a single reading of pressure within the air duct 472 alone is insufficient to determine the degree to which the air filter is blocked. That is, because the pressure in the air duct 472 depends on many different factors such as barometric pressure, characteristics of the air ducts, and characteristics of the furnace and its fan.

The distributed monitoring and control system 400 is programmed to learn, over the course of several days, to distinguish such environmental factors from the factor of interest, which is filter blockage. The distributed monitoring and control system 400 does so by first detecting an operating state of the fan 410. It can do so without being connected to the fan 410 simply by sensing the pressure within the air duct 472 and applying a pattern recognition algorithm to detect a jump in pressure. Provided the pressure sensor 431 is on the suction side of the fan, upstream of the filter, a sudden jump from a higher pressure to the lower pressure indicates that the fan has been turned on. A sudden jump from a lower pressure to a higher pressure indicates that the fan has been turned off.

The distributed monitoring and control system 400 may further compare the pressure while the fan is running with the pressure while the fan is off. This provides a differential pressure signal which eliminates barometric pressure as a noise factor.

The differential pressure alone does not provide sufficient information as to whether the filter is blocked or not. The distributed monitoring and control system 400 is further programmed to record and store data relating to the pressure difference in the air duct 472 while the fan is on with the pressure while the fan is off. Over several weeks this pressure difference tends to become smaller as the air filter becomes more blocked and less air is flowing through. Once the filter is replaced, the pressure difference increases from one fan activation cycle to the next.

The distributed monitoring and control system 400 thus monitors a sensor input to detect a first pattern to decide whether the fan is on or off, i.e. to detect an operating state of the system. It monitors the same sensor input to detect a maintenance event, here the change of an air filter in a forced air heating system. Having recorded the sensor data associated with the maintenance event, the distributed monitoring and control system 400 can now predict the need of a future maintenance event.

Figure 5:
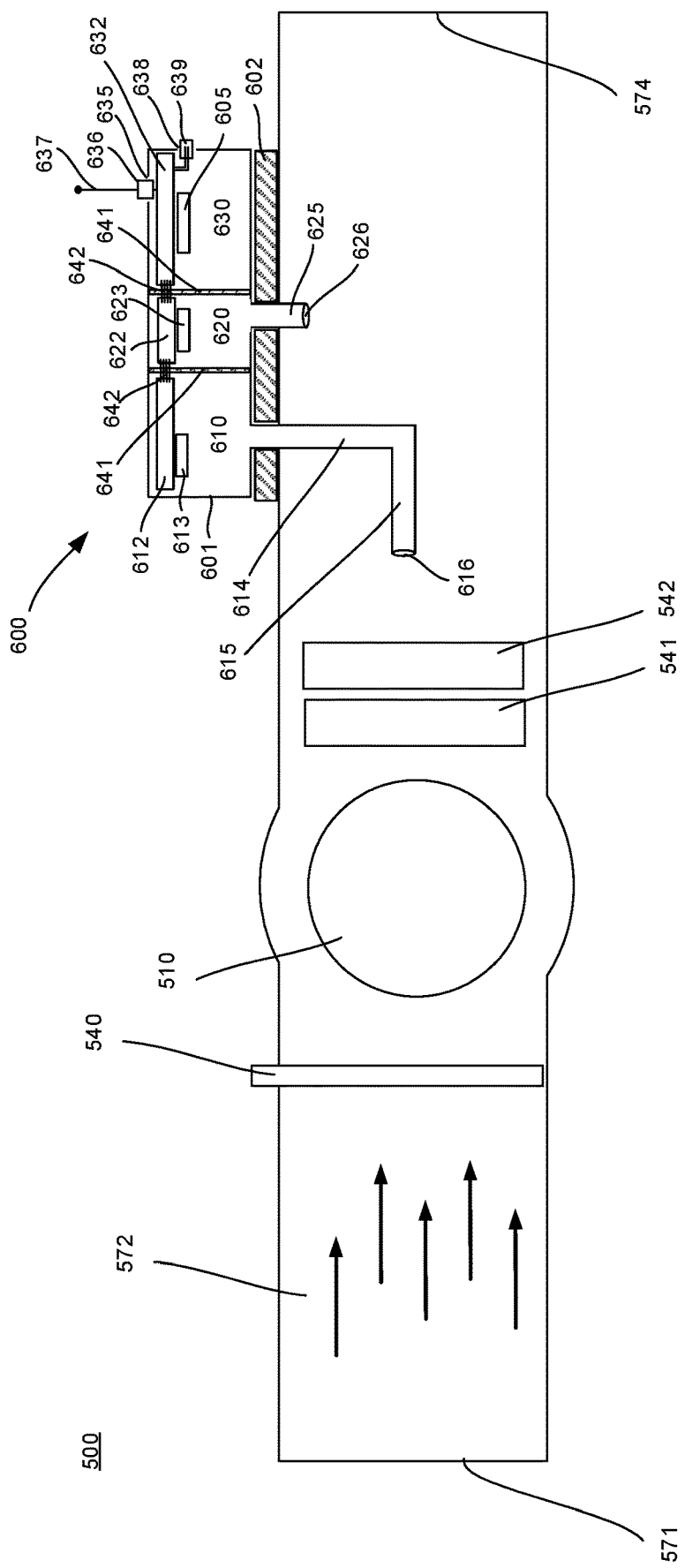
FIG. 5 is a schematic illustration of a forced air heating/cooling system.

Referring now to FIG. 5, a portion of a forced air heating and/or cooling system 500 is schematically shown. The forced air system circulates fluid within a space. Here, the fluid is air and the space is one or more rooms within a building. Air is sucked into the circulation system through return registers 571 arranged throughout the building. The air flows from the return registers 571 through air ducts 572 towards supply vents 574. The supply vents 574 are arranged throughout the building. A blower 510, typically powered by an electric blower motor, is arranged within an air handling unit to affect the flow of air through the system.

Arranged downstream of the blower 510 within the air handling unit are a heating element 541 and/or a cooling element 542. Arranged upstream of the blower 510 is an air filter 540. The air filter 540 is a device composed of fibrous or porous materials which removes solid particulates such as dust, pollen, mold, and bacteria from the air. The air filter 540 may be a disposable paper filter. Other types of filters, e.g. an electrostatic filter, may be used.

With continued use, the air filter 540 becomes clogged and provides increasing resistance to the flow of air through the air duct 572. Consequently, less air volume circulates through the forced air system 500 in a given amount of time, and the system becomes less effective. A clogged air filter 540 requires increased run-times of the blower 510 to circulate the same volume of air, thereby causing increased consumption in electrical energy to power the blower motor. It is thus desirable to detect when the air filter 540 has reached a resistance that requires replacement, in case of a disposable filter, or maintenance/cleaning, in case of a reusable filter.

Generally, the static pressure drop across the filter is an indication of the filter's resistance. Alternatively, the flow of air upstream or downstream of the filter can be analyzed to determine the filter's state of health. Here, we will refer to a new, clean (unclogged) filter as having a state of health of 100% and a filter that has deteriorated such that replacement of the filter is indicated has a state of health of 0%.

Monitoring air flow through the air duct 572 can be accomplished by a sensor 600. The sensor 600 includes a housing 601 which is separated into separate compartments 610, 620, 630. The separate compartments are sealed against one another and separated by walls 641. Therefore, a first air pressure 611 in a first sensor compartment 610, a second air pressure 621 in a second sensor compartment 620, and a third air pressure 631 in a third sensor compartment 630 can all be different.

Arranged within the housing are one or more circuit boards. More specifically, a first circuit board 612 may be arranged within the first sensor compartment 610. A second circuit board 622 may be arranged within the second sensor compartment 620. A third circuit board 632 may be arranged within the third sensor compartment 630.

The circuit boards 612, 622, 632 are electrically interconnected by electrical contacts 642 which extend through the walls 641 which separate the adjacent sensor compartments. To maintain the sealing between separate compartments the electrical contacts 642 may be metal pins which are molded into the compartment walls 641 and electrically connected to the circuit boards. Alternatively, the circuit boards 612, 622, 632 may be sections of a rigid-flex circuit board with flexible portions that extend through and are sealed within the compartment walls.

The sensor 600 is attached to an air duct 572. More specifically, the sensor 600 may be glued onto a wall of the air duct 572, e.g. by using a closed cell foam strip 602. The foam strip 602 may have adhesive surfaces that attach the housing 601 of the sensor 600 onto a wall of the air duct 470 in a sealed manner.

The first sensor compartment may be in fluid connection with a pitot-tube 615 which reaches into the air duct 572. The Pitot tube 615 is preferably arranged parallel to the walls of the air duct 572 with an opening 616 facing the flow of air propelled by the blower 510. The Pitot tube 615 is held in place at a distance from the wall of the air duct by an intermediate tube 614 which connects the first sensor compartment 610 with the Pitot tube 615.

When in use, the ram air pressure at the opening 616 of the Pitot tube is transferred into the first sensor compartment 610 and converted to an electronical signal by a first air pressure sensor 613 on the first circuit board 612. The first air pressure sensor 613 may be a BMP280 or BMP380 barometric pressure sensor made by Bosch.

Alternatively or additionally, the static air pressure within the air duct 572 may be measured through an opening 626 of a tube 625 which connects the second sensor compartment 620 with the inside of the air duct 572. Arranged within the second sensor compartment 620 is a second air pressure sensor 623 on the second circuit board 622.

The first air pressure 611 in the first sensor compartment 610 is the ram air pressure at the Pitot tube 615. The second air pressure 621 in the second sensor compartment 620 is the static air pressure in the air duct 572. The first air pressure and the second air pressure are converted to electronic signals, by respective first and second pressure sensors 613, 623. The electronic signals are communicated to the processor 605 which is arranged on the third circuit board 632 in the third sensor compartment 630. The electronic signals may be communicated through serial messages, e.g. through a SPI or I2C interface.

While the third sensor compartment 630 is sealed relative to the first and second sensor compartments 610, 620, it need not be sealed against its environment. Rather, the third sensor compartment 630 may include external openings that provide access to the third sensor compartment. The third sensor compartment 630 may include an opening 635 through which an antenna connector 636 connects the third circuit board 632 with an external antenna 637. Similarly, an opening 638 in the housing 601 of the sensor 600 may accommodate a power connector 639 through which the sensor 600 can be supplied with electric power.

The sensor 600 need not necessarily comprise three sensor compartments 610, 620, 630. Rather, to reduce cost, typical applications will utilize only two compartments: A pressurized compartment 610, 620 and a non-pressurized compartment 630. The pressurized compartment may be connected to the inside of the air duct by a static pressure tube 625 or by a pitot tube 615.

A static pressure configuration may be used upstream of the blower motor 510 to measure the static pressure drop over the air filter 540. For example, a three-compartment configuration of the sensor 600 may be used to measure static air pressure upstream and downstream of the air filter 540 to directly determine the filter's resistance.

Alternatively, a two-compartment configuration of the sensor 600 may be used to measure the static pressure in the space between the air filter 540 and the blower 510. In that configuration, the processor 605 may be configured to monitor, through a pressure sensor 623, the static air pressure. The processor 605 may be configured to detect a sudden change in pressure. A "sudden change" here refers to a change that is indicative of the blower 510 turning on or off rather than a change in atmospheric pressure. A sudden change may e.g. be a pressure change of more than 1 mbar in less than 10 seconds. More generally, a sudden change is defined as a change in air pressure greater than a pressure threshold value within a predetermined time period. The pressure threshold is preferably in the range of 0.1 mbar to 1 mbar. A favorable pressure threshold is about 0.25 mbar. The time period is preferably between 5 seconds and 30 seconds. A sudden decrease in air pressure, measured upstream, i.e. towards the return register, of the blower indicates that the blower has been turned on. A sudden increase in air pressure indicates the blower having turned off. The amount of change, i.e. the absolute pressure difference that occurs within a short period of time when the blower turns on or off is indicative of the resistance of the air filter 540. However, the absolute change can vary from installation to installation, and can only be correctly interpreted after observing the pressure over the course of several days, weeks, or even months.

Over the course of several days, weeks, or months, the drop in pressure from atmospheric pressure, when the blower is off, to a lower suction pressure, when the blower is on, increases as the resistance of the air filter 540 increases. After the air filter has been changed the pressure drop upon turning the blower on—and the corresponding pressure increased upon turning the blower off—returns to a lower start value. The processor 605, or a remote server which is in communication with the processor 605, is configured to recognize the maintenance event and associate a 100% state of health of the air filter with the minimum pressure change upon turning the filter on or off. This minimum pressure change may e.g. be 1 mbar.

An increased pressure change is associated, by the processor 605 or the remote server, with a decreased state of health of the air filter. For example, a pressure drop of 2 mbar, may be associated with a state of health of 0%. More generally, the processor 605 or the remote server may be configured to determine a minimum pressure drop/jump upon turning on/off the blower $p_{on\_off\_min}$. The minimum pressure drop/jump $p_{on\_off\_min}$ may be determined and adjusted over the course of several days, weeks, or months. The minimum pressure drop/jump is expected when the air filter has been changed or cleaned.

A reduced state of health of the air filter is associated with a larger pressure drop/jump. The processor 605 or the remote server may be configured to issue a filter maintenance alert if the observed pressure drop/jump, preferably determined over the course of several on/off cycles of the blower, exceeds a predetermined allowable value. The predetermined allowable value may be obtained by multiplying the minimum pressure drop/jump $p_{on\_off\_min}$ with a factor k. That is, an alert is issued once $p_{on\_off\_max} = k * p_{on\_off\_min}$ has been observed.

Instead of monitoring the pressure drop in the air duct upstream of the blower upon turning on the blower a pressure increase in the air duct downsteam of the blower may be observed. Preferably, a ram pressure of the moving air downstream of the blower may be observed with a pitot tube. In this case, a clean filter will be associated with a larger pressure increase than a clogged filter.

While the present disclosure includes many embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

What is claimed is:

1. A sensor for a forced air monitoring system, comprising:
    a pressure sensor arranged within a housing, the pressure sensor being in fluid communication with an air duct of a forced air heating or cooling system and configured to measure an absolute air pressure in the air duct; and
    a processor operatively connected to the pressure sensor,
    wherein the processor is configured to detect a sudden change in the absolute air pressure and associate a change in operating status of a fan of the forced air heating or cooling system with the sudden change in the absolute air pressure, and
    wherein the processor is further configured to associate a magnitude of the sudden change in absolute air pressure with a state of health of a filter arranged within the air duct.

2. The sensor as in claim 1, wherein the housing comprises a first housing compartment and a second housing compartment, the first housing compartment being sealed airtight relative to the second housing compartment.

3. The sensor as in claim 2, wherein the pressure sensor is arranged in the first housing compartment and the processor is arranged in the second housing compartment.

4. The sensor as in claim 3, wherein the second housing compartment comprises an opening for a connector.

5. The sensor as in claim 1,
    wherein the processor comprises a non-volatile memory,
    wherein at least one of a minimum sudden pressure change value and a maximum sudden pressure change value is stored within the non-volatile memory, and
    wherein the processor is configured to determine the state of health of the filter by comparing the detected sudden change in absolute pressure with the stored minimum sudden pressure change value or the stored maximum sudden pressure change value.

6. The sensor as in claim 5,
    wherein the processor is configured to determine and store the at least one of a minimum sudden pressure change value and a maximum sudden pressure change value by evaluating the detected sudden change in absolute air pressure over the course of several days.

7. The sensor as in claim 1,
    wherein the processor is operatively connected to a wireless communication module and configured to communicate a deteriorated state of health of the filter to a user.

8. The sensor as in claim 1,
    wherein the pressure sensor is in fluid communication with the air duct of the forced air heating or cooling system downstream of the filter and upstream of a blower motor arranged within the air duct.

9. The sensor as in claim 1,
    wherein the sudden change in absolute pressure is detected if the absolute pressure at the pressure sensor changes more than 0.25 mbar within 60 sec.

10. A method for monitoring a forced air heating or cooling system, comprising:
    providing within a housing a pressure sensor and a processor operatively connected to the pressure sensor;
    arranging the pressure sensor to be in fluid communication with an air duct of the forced air heating or cooling system;
    detecting, by the processor in response to a signal received from the pressure sensor, a sudden change in absolute pressure;
    associating a change in operating status of a fan of the forced air heating or cooling system with the sudden change in absolute pressure; and
    associating a magnitude of the sudden change in absolute pressure with a state of health of a filter arranged within the air duct.

11. The method as in claim 10, further comprising:
    drilling a hole into the air duct to establish the fluid communication between the pressure sensor and the air duct.

* * * * *